United States Patent [19]
Nagamoto

[11] Patent Number: 6,163,528
[45] Date of Patent: Dec. 19, 2000

[54] SELECTIVE CELL DISCARD SYSTEM IN ATM SWITCH

[75] Inventor: Mamoru Nagamoto, Tokyo, Japan

[73] Assignee: NEC Corporation, Tokyo, Japan

[21] Appl. No.: 09/188,407

[22] Filed: Nov. 10, 1998

[30] Foreign Application Priority Data

Nov. 12, 1997 [JP] Japan ..................... 9-325146

[51] Int. Cl.[7] ............ G01R 31/08; H04L 12/28
[52] U.S. Cl. ................... 370/236; 370/395; 370/413
[58] Field of Search ............... 370/235, 236, 370/238, 395, 398, 412, 413; 709/234

[56] References Cited

U.S. PATENT DOCUMENTS

| | | | |
|---|---|---|---|
| 5,276,684 | 1/1994 | Pearson | 370/94.1 |
| 5,323,399 | 6/1994 | Kurano | 370/112 |
| 5,528,587 | 6/1996 | Galand et al. | 370/60 |
| 5,602,841 | 2/1997 | Lebizay et al. | 370/413 |
| 5,732,085 | 3/1998 | Kim et al. | 370/218 |
| 5,758,089 | 5/1998 | Gentry et al. | 395/200.64 |
| 5,764,641 | 6/1998 | Lin | 370/412 |
| 5,774,453 | 6/1998 | Fukano et al. | 370/398 |
| 5,787,072 | 7/1998 | Shimojo et al. | 370/231 |

Primary Examiner—Hassan Kizou
Assistant Examiner—Hanh Nguyen
Attorney, Agent, or Firm—McGuire Woods, LLP

[57] ABSTRACT

Disclosed is a selective cell discard system in an ATM switch to transfer exchanging a cell input from a plurality of input ports to a plurality of output ports, for controlling the selective cell discard to guarantee QOS (quality of service) by controlling the order of cell discard or the read-out order of cells accumulated in cell buffer when a plenty of cells exceeding the exchange capability of the switch is input, the system having: a selective cell discard controller connected to each of the plurality of input ports; a first-stage switch unit comprising all of cell buffers for output port group provided corresponding to output port groups into which the plurality of output ports are divided, and a cell multiplexer which inputs exchanging all of cells to be input from the plurality of input ports through the selective cell discard controller according to routing information of concerned cells; a groups of second-stage switch units which are provided corresponding to each of the cell buffers for output port group and input exchanging a cell in a concerned cell buffer for output port group to any of cell buffers for output port provided corresponding to output ports belonging to a concerned output port group; and means for detecting a congestion in the cell buffer for output port group, and discard-controlling a cell to be input to the concerned cell buffer for output port group in the selective cell discard controller.

10 Claims, 6 Drawing Sheets

SELECTIVE CELL DISCARD SYSTEM IN ATM SWITCH

FIELD OF THE INVENTION

This invention relates to a switch composition of ATM (asynchronous transfer mode) communication system, and more particularly to, a selective cell discard system in ATM switch.

BACKGROUND OF THE INVENTION

In ATM switch, the order of cell discard when a large number of cells are input exceeding the switch's exchange capability, or the order of reading of cells accumulated in cell buffer is preset as a discard characteristic or a delay characteristic, and the cell transfer control in conducted according to the characteristic.

By properly conducting the discard order and the delay order (in other words, the order of reading from cell buffer), the quality of service can be guaranteed. The quality of service is represented by 'QOS(quality of service)'.

As a prior art to the invention, for example, Japanese patent application laid-open No.7-297840 (1995) discloses 'priority control system in output buffer type ATM switch' (hereinafter referred to as 'prior art 1'). FIG. 1 is a block diagram showing the circuit composition of the ATM switch used in prior art 1.

An example of the conventional circuit composition and operation will be explained in FIG. 1.

In the example of FIG. 1, when a cell is transferred from N input ports HWIN-1 to -N to N output ports HWOUT-1 to -N, an input buffer 2 to each input port and an output buffer 12 to each output port are provided.

Each input buffer 2 in provided with one logical queue 22 for each output port and each service class QOS guaranty, a write controller 21 to control the writing into this logical queue 22, and a read controller 23 to control the reading of this logical queue 22.

A cell output from each input buffer 2 is connected through a switch 11 to an output buffer 12 corresponding to the addressed output port. To each output buffer 12, a cell threshold detector 13 to detect a congestion signal to indicate whether the amount of cells accumulated in the output buffer 12 exceeds a predetermined threshold value or not is connected. All the output signals of the detectors 13 are input to the read controller 23 of each input buffer 2.

In the system shown in FIG. 1, for each cell, a discard quality class and a delay quality class are predetermined. The read controller 23 temporarily changes the classes according to a signal from the cell threshold detector 13. After the changing, it controls the logical queues so that they are sequentially output in order of class height.

Meanwhile, when a large-scale switch is composed, designing a switch with large switch processing can minimize the size of hardware. Also, to get a good control characteristic, it is necessary to add QOS guaranty, i.e., control functions to guarantee mainly a discard characteristic and a delay characteristic. However, the more the control function is complicated, the longer the time of processing needs to be.

Also, when the switch has larger switch processing, time of processing to be assigned to one cell is reduced. Therefore, it becomes difficult to complicate the control function so as to guarantee QOS.

Further, when the output link band of switch is enlarged, a higher characteristic to the amount of buffers mounted can be obtained by the statistical multiplexing effect.

Therefore, it is desirable that ATM switches are comprised of multistage, e.g., two-stage, switch units, where the first-stage switch unit is so comprised that the size of switch processing is made as large as possible, the link band is increased, function as to QOS guaranty is simplified, and the second-stage switch unit is comprised of an assembly of small-scale and multifunctional switches to conduct the switch processing at output port band and to sufficiently achieve the function as to QOS guaranty.

However, if the second-stage switch unit is provided with all the function as to QOS guaranty, there will be no means for controlling the cell discard by HOL (head of line blocking) occurring in the first-stage switch unit. Therefore, the means for controlling the cell discard must be also given to the first-stage switch unit.

However, the first-stage switch unit must have such a low cell discard ratio that does not influence the cell discard control characteristic by QOS guaranty of the second-stage switch unit.

A problem for the circuit disclose din prior art 1 is that the input cell buffer 2 in FIG. 1 conducts the control as to QOS guaranty. Namely, the queuing management is necessary for service class unit to conduct QOS guaranty and for each output port unit. Therefore, the circuit size has to be enlarged as the number of management is increased.

Also, it is difficult to conduct the QOS guaranty at the input buffer 2 distant from the output port because it is to be conducted to the output port link band.

SUMMARY OF THE INVENTION

Accordingly, it is an object of the invention to provide a large-scale ATM switch that the QOS guaranty is sufficiently achieved by forming a multistage connection of various ATM switches and the circuit size is not enlarged.

According to the invention, a selective cell discard system in an ATM switch to transfer exchanging a cell input from a plurality of input ports to a plurality of output ports, for controlling the selective cell discard to guarantee QOS (quality of service) by controlling the order of cell discard or the read-out order of cells accumulated in cell buffer when a number of cells exceeding the exchange capability of the switch is input, comprises:

a selective cell discard controller connected to each of the plurality of input ports;

a first-stage switch unit comprising all of cell buffers for output port group provided corresponding to output port groups into which the plurality of output ports are divided, and a cell multiplexer which inputs exchanging all of cells to be input from the plurality of input ports through the selective cell discard controller according to routing information of concerned cells;

a group of second-stage switch units which are provided corresponding to each of the cell buffers for output port group and input exchanging a cell in a concerned cell buffer for output port group to any of cell buffers for output port provided corresponding to output ports belonging to a concerned output port group; and means for detecting a congestion in the cell buffer for output port group, and discard-controlling a cell to be input to the concerned cell buffer for output port group in the selective cell discard controller.

In this invention, the ATM switch is comprises of the first-stage switch unit (hereinafter referred to as 'SW1') and the second-stage switch unit (hereinafter referred to as 'SW2'), the selective cell discard controller (hereinafter referred to as 'PD') is provided for each input port before SW1, a cell to be output form each PD is multiplexed by unit of one cell data by the cell multiplexer (hereinafter referred to as 'CI'), each cell data is stored into the cell buffer (hereinafter referred to as 'CB1-1 to CB1-y') based on its routing information.

In this case, the total number of CB1 is less than the total number of the output ports, several output ports are packed into one output port group, each of CB1-1 to CB1-y is provided for each one output port group. In this sense, CB1-1 to CB1-y is called 'cell buffer for output port group'.

In SW2, a group of switches (y switches for each of CB1-1 to CB1-y) is provided for each CB1, in each switch group a cell read out from CB1 is output to each output port belonging to the output port group corresponding to concerned CB1.

Thus, each switch group in SW2 becomes small, and therefore is provided with control functions to guarantee QOS.

However, to prevent the cell discard occurrence by HOL, the discard control is conducted at PD, based on the congestion information of CB1.

BRIEF DESCRIPTION OF THE DRAWINGS

The invention will be explained in more detail in conjunction with the appended drawings, wherein.

DESCRIPTION OF THE PREFERRED EMBODIMENTS

Figure 1:
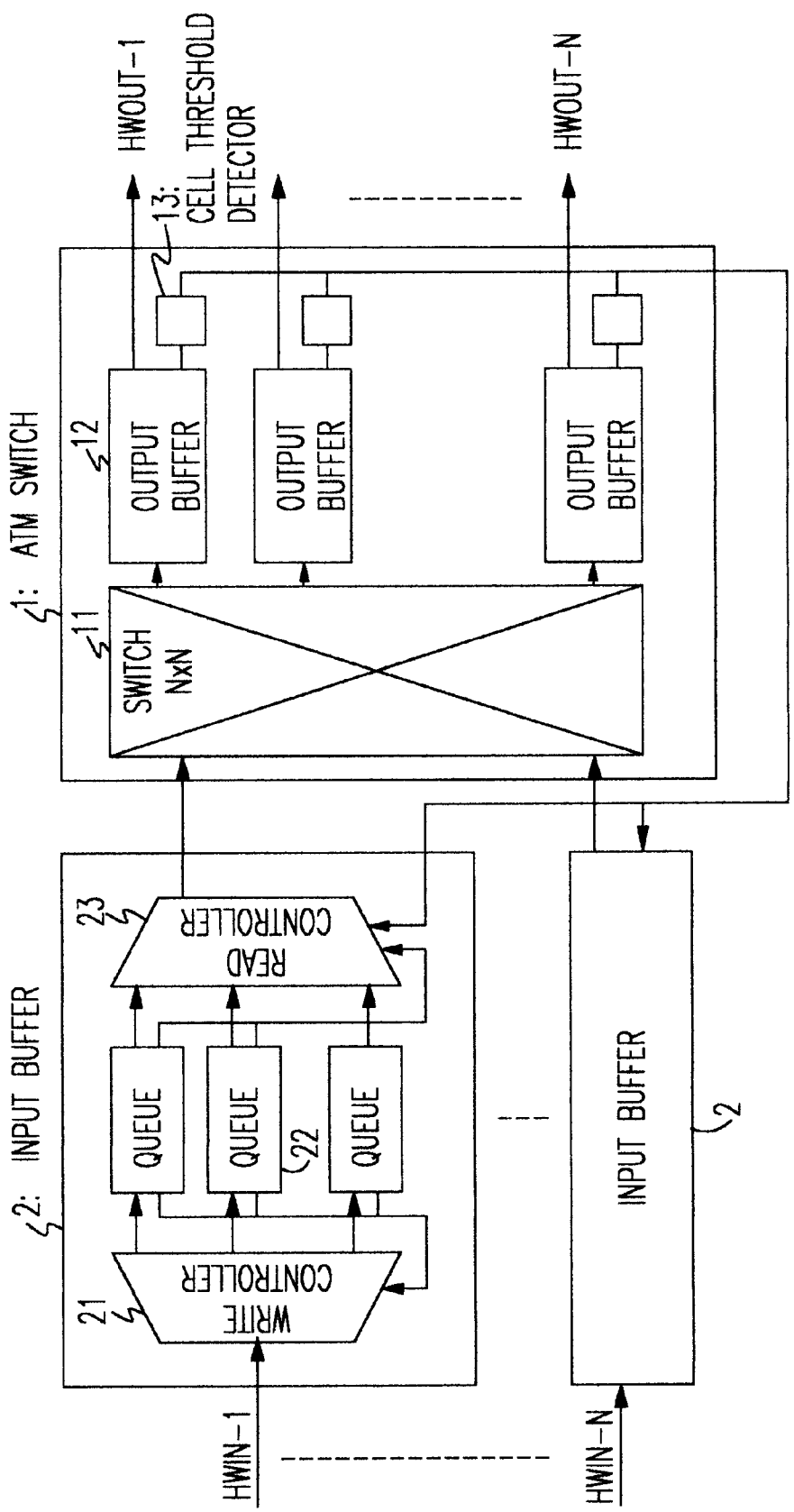
FIG. 1 is a block diagram showing an example of a conventional ATM switch.

The preferred embodiments of the invention will be explained below, referring to the drawings.

Figure 2:
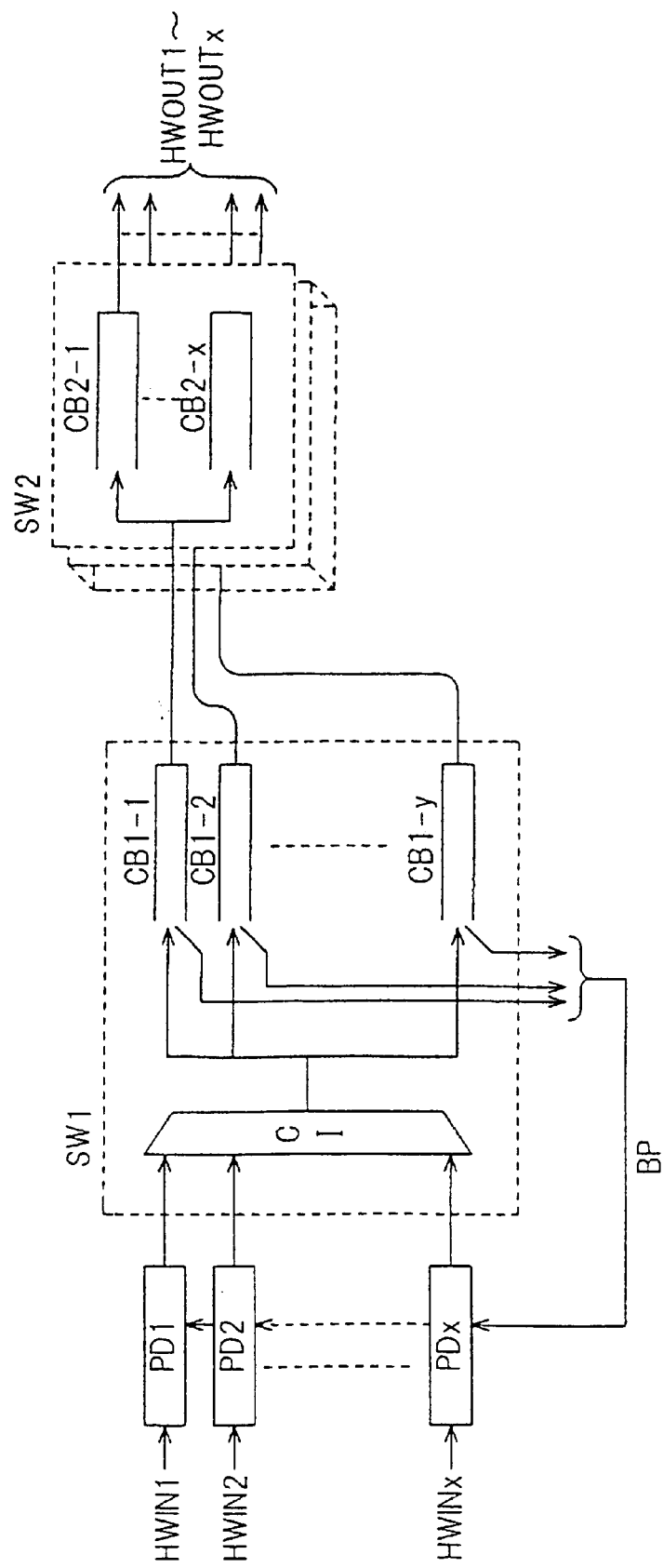
FIG. 2 is a block diagram showing a preferred embodiment of the invention.

FIG. 2 is an block diagram showing a ATM switch in a preferred embodiment of the invention. In FIG. 2, HWIN1 to HWINx are input ports, PD1 to PDx are selective cell discard controllers (PD).

An input to each PD is multiplexed by a cell multiplexer (hereinafter referred to as 'CI'), stored into a targeted cell buffer CB1 of cell buffers CB1-1 to -y for an output port group according to the routing information of an input cell.

All output ports are classified into several output port groups, several output port groups belong to one output port group, one cell buffer CB1 for output port group is provided for each one output port group. CI and CB1 compose a first-stage switch unit (SW1).

In a second-stage switch unit (SW2), a group of switches is provided for each CB1, each cell in each CB1 is input to each output buffer CB2 corresponding to each output port in a concerned output port group.

Though most of various controls for QOS guaranty are conducted in CAC (connection admission control) as to connection between an output port corresponding to each CB2 in SW2 and its link (transmission line), only the cell discard control to control HOL (head of line blocking) is conducted by PD.

Control for QOS guaranty to be conducted by CB2 of SW2 can be conducted by any conventional method, and therefore its explanation is omitted herein.

Next, the cell discard control operation of PD relating to the congestion state of CB1 will be explained.

The cell discard control varies depending on the service class of cell. In a class such as CBR (constant bit rate), rt-VBR (real time variable bit rate) and nrt-VBR (non real time variable bit rate), the connection is set by CAC (connection admission control) according to the throughput characteristic. Therefore, even when the cell discard by the overflow of cell buffer at CB1 of SW1 occurs, it does not give a serious influence to the traffic of other class or other output port.

Also, ABR (available bit rate) class does not give a bad influence to the traffic of other class because it transits to avoid the congestion by band control.

However, the traffic of UBR (unspecified bit rate) class is a service to transmit using all empty band and its connection is set without noticing the band assignment to output link. Therefore, it is input even from input port by using a surplus band of other class. When this converges on a specific output port, it causes an unpredictable congestion state at cell buffer. Thus, when this UBR class traffic cell is input to a switch where no QOS control as to UBR class traffic is conducted, the characteristic interference to other class occurs in congestion.

From these reasons, the UBR class cell should be subject to the discard control at PD and further the target cell of cell discard control at PD may be limited to UBR class cell.

Next, the cell discard control at PD is conducted according to the congestion state at the cell buffer CB1 for output port group, where a threshold value (for example, a common threshold value to all the buffers) to each of the buffers CB1-1 to -y is preset and the number of staying cells in a concerned buffer and its threshold are compared. If the number of staying cells ≧ preset threshold value . . . (1), the signal of logic "1" is output, and if it is not so, the signal of logic "0" is output. These signals are hereinafter referred to as "a back pressure signal (or abbreviated as 'BP')".

The selective cell discard controllers PD1 to PDx check the logic of signal BP from a passed cell buffer of the cell buffers CB1 for output port group according to routing information of the input cell. When at least one signal of "1" exists, BP to the concerned input cell is processed as logic "1"(congestion existing).

When the cell discard control at PD is conducted by the BP logic, a discard control, such as unconditional discard control, EPD (early packet discard) discard control, and BPD-PPD (partial packet discard) combined discard control, is conducted. These discard controls are publicly known and the specifications are established. Therefore, general explanations thereof are omitted herein.

Examples of the respective discard controls will be explained below.

For example, when the input cell is of UBR class, if BP-"1", it is discard-controlled, and if BP-"0", it is pass-controlled. Such control is the unconditional discard control.

Figure 3:
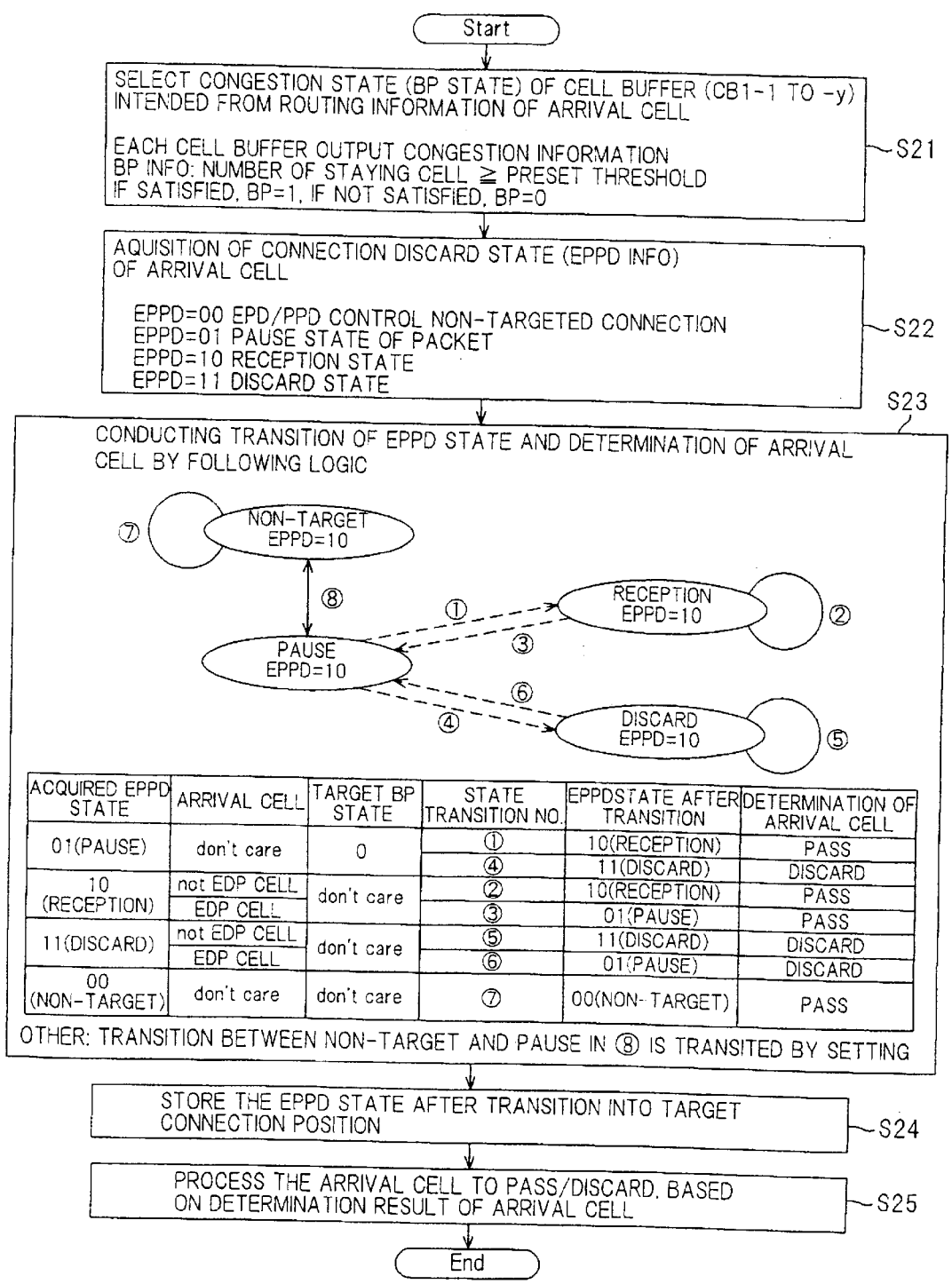
FIG. 3 is a flow chart showing an example of operation of the embodiment in FIG. 2.

FIG. 3 is a flow chart showing a processing flow in conducting EPD discard control, where S21 to S25 indicate processing steps.

In S21, the BP logic is determined by using expression (1) described above. In EPD discard control, other than the BP logic, the discard state (EPPD information) of input cell connection and whether the concerned cell is an end-cell of packet (EOP: end of packet) or not are considered.

In S22, EPPD information is acquired and represented by a 2-bit binary number. A non-target connection to EPD or PPD control is represented by "00", a pause state "01", a reception state of packet "10", and a discard state of packet "11".

In S23, based on BP of CB1 buffer lying on the routing place of input cell, EPPD acquired in S22, and whether the input cell is EOP or not, the transition of state and the discard determination are conducted.

For example, if EPPD="01" and BP="0", the arrival cell is a first cell of packet and it is determined that no congestion exists on its routing. So, the concerned cell is passed, EPPD is transited to "10" (reception state). If BP="1", then the arrival cell is discarded and EPPD is transited to "11" (discard state).

Figure 4:
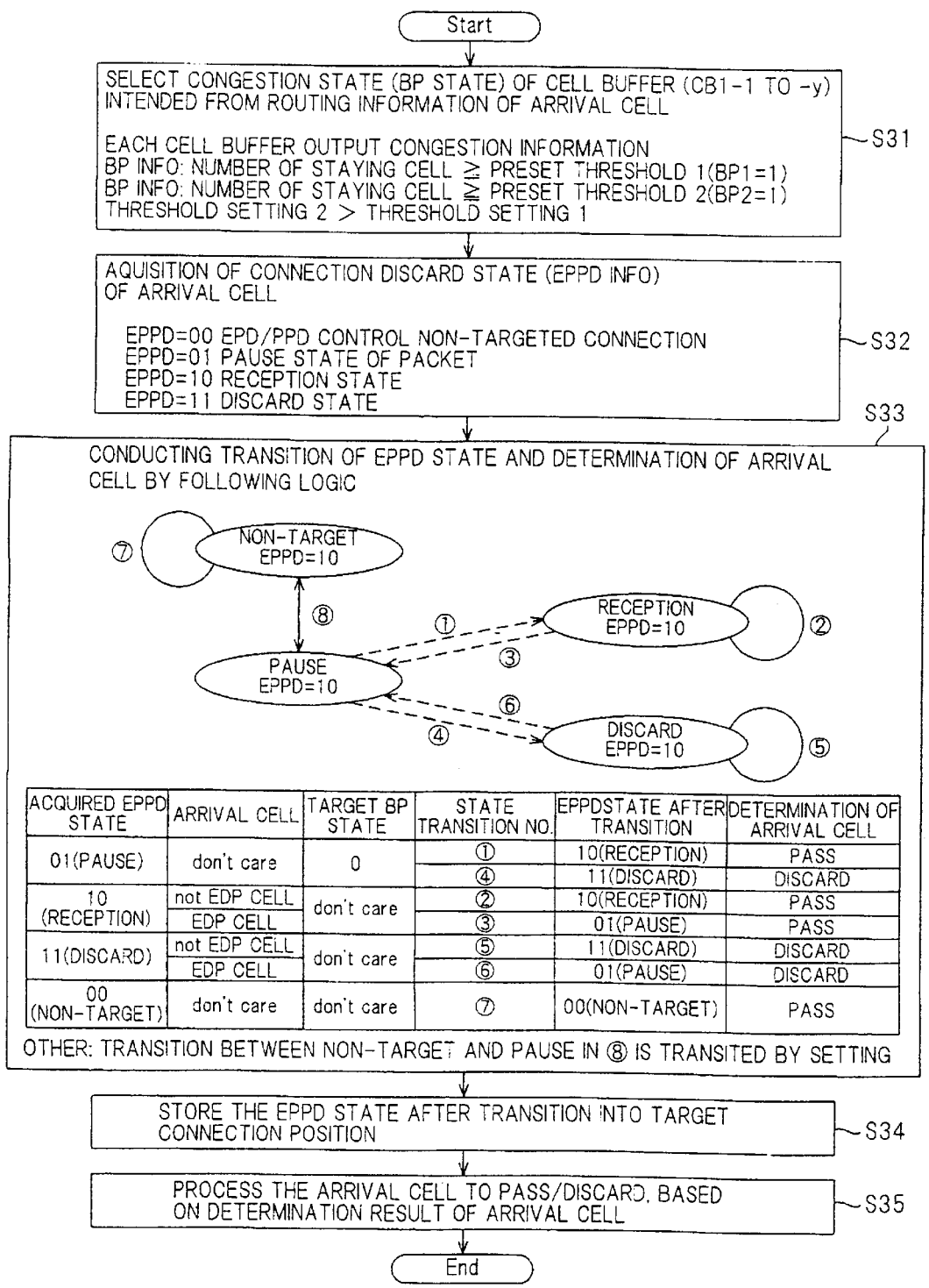
FIG. 4 is a flow charge showing another example of operation of the embodiment in FIG. 2.

FIG. 4 is a flow chart showing a processing flow in conducting EPD-PPD combined discard control, where S31 to S35 indicate processing steps.

In S31, the BP logic is determined by using expression (1) described above. However, in this case, two kinds of threshold values, 1 and 2, are provided, where BP is of two signals of BP1 and BP2 and the logic of the signals is represented by "0" or "1".

In S32, EPPD information is required.

In S33, based on BP1, BP2 of CB1 buffer lying on the routing place of input cell, EPPD acquired in S32, and whether the input cell is EOP or not, the transition of state and the discard determination are conducted.

A different point from S23 in FIG. 3 is that, for example, if the acquired EPPD is "10" (reception state) and BP2="1" (extreme congestion), then the arrival cell is discarded in the control of FIG. 4.

By order of unconditional discard control, EPD discard control and EPD-PPD combined discard control, the characteristic deterioration due to the interference to other class traffic can be reduced.

In storing cell data into output buffers CB2 of SW2, to sufficiently conduct the control necessary for QOS guaranty, the controls of the queue management to each management class unit, the discard determination when storing cell into queue, and the determination of read-out queue are made by a control system to sufficiently satisfy the cell discard characteristic and delay characteristic as to QOS guaranty.

In reading out cell data from the output cell buffer CB2, the cell data is sequentially output according to the output bands of corresponding output ports HWOUT1 to HWOUTx.

Meanwhile, the throughput characteristic realizable by SW1 is the maximum characteristic, and, within this characteristic range, the control as to QOS guaranty is conducted by SW2.

Also, the discard control at PD is designed to reduce only the interference between classes due to a congestion occurrence in SW1. Therefore, to guarantee the packet discard characteristic as one of QOS guaranties, it is necessary to conduct the packet discard control according to the congestion state of a concerned queue at the output cell buffer CB2 of SW2.

Figure 5:
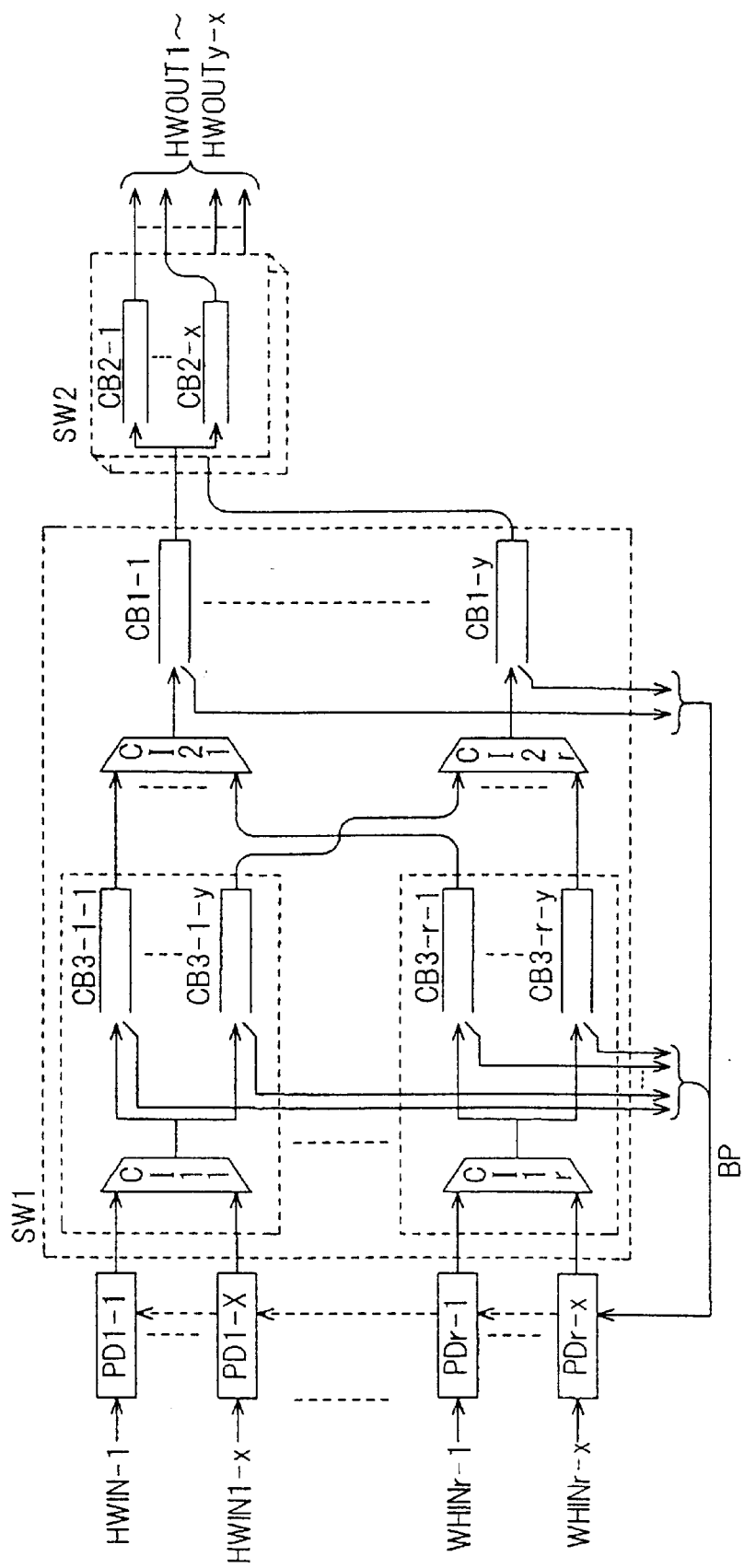
FIG. 5 is a block diagram showing another preferred embodiment of the invention.

FIG. 5 is a block diagram showing another preferred embodiment of the invention, wherein same or corresponding parts are indicated by same reference codes as used in FIG. 2 and operate similarly, therefore their explanations are omitted herein.

The different point between FIG. 5 and 2 is that, in FIG. 5, the input ports are divided into several input port groups and CI in FIG. 2 is provided for each of the input port groups, so as to compose a further large-scale switch. This is brought by CI11 to CI1r in FIG. 5.

As the cell buffer CB1-1 to CB1-y for output port group are provided for CI in FIG. 2, cell buffers of number y are provided for each CI in FIG. 5. For example, for CI1r, cell buffers CB3-r-1 to CB3-r-y for output port group are provided.

In other words, in FIG. 5, the cell buffer CB1-1 in FIG. 2 is dispersed into cell buffers CB3-1-1 to CB3-1-y for output port group. In this sense, CB3 is referred to as 'dispersion buffer'.

The contents of the r dispersion buffers dispersed by CI11 to CI1r are accumulated again into CB1-1 to CB1-y by CI21 to CI2y shown in FIG. 5.

The relationship between CB1-1 to CB1-y and SW2 in FIG. 5 is similar to that between CB1-1 to CB1-y and SW2 in FIG. 2.

Also in the composition shown in FIG. 5, in the entire SW1, the functions as to QOS guaranty are simplified, the link band is enlarged, the size of switch processing is enlarged as much as possible. In this case, the selection of congestion state i the cell discard controllers PD1-1 to PD1-x provided as the pre-stage of SW1 is conducted for one of the cell buffers CB1 and one of the cell buffers CB3, based on the routing information of input cell. When the congestion occurs in either one of the two congestion states, it is determined that congestion is existing.

The state transition and the determination of discard are as explained in FIG. 2.

Meanwhile, in composing the large-scale ATM switch, SW1 may be of further multistage composition, and may be of cross point type, Banyan type, Stage type etc.

Advantages of the invention

As described above, according to the invention, the large-scale switch processing part comprises the first-stage switch unit SW1, the selective cell discard controller PD is provided at its pre-stage. Thereby, the occurrence of overload due to traffic, such as a UBR class cell, without noticing the band assignment to output link can be prevented. Therefore, the interference between classes and the deterioration of QOS can be prevented.

Also, the other various control mechanisms to guarantee QOS are completely removed from SW1. Therefore, the function of SW1 can be simplified, thereby obtaining a small-sized large-scale ATM switch.

Figure 6:
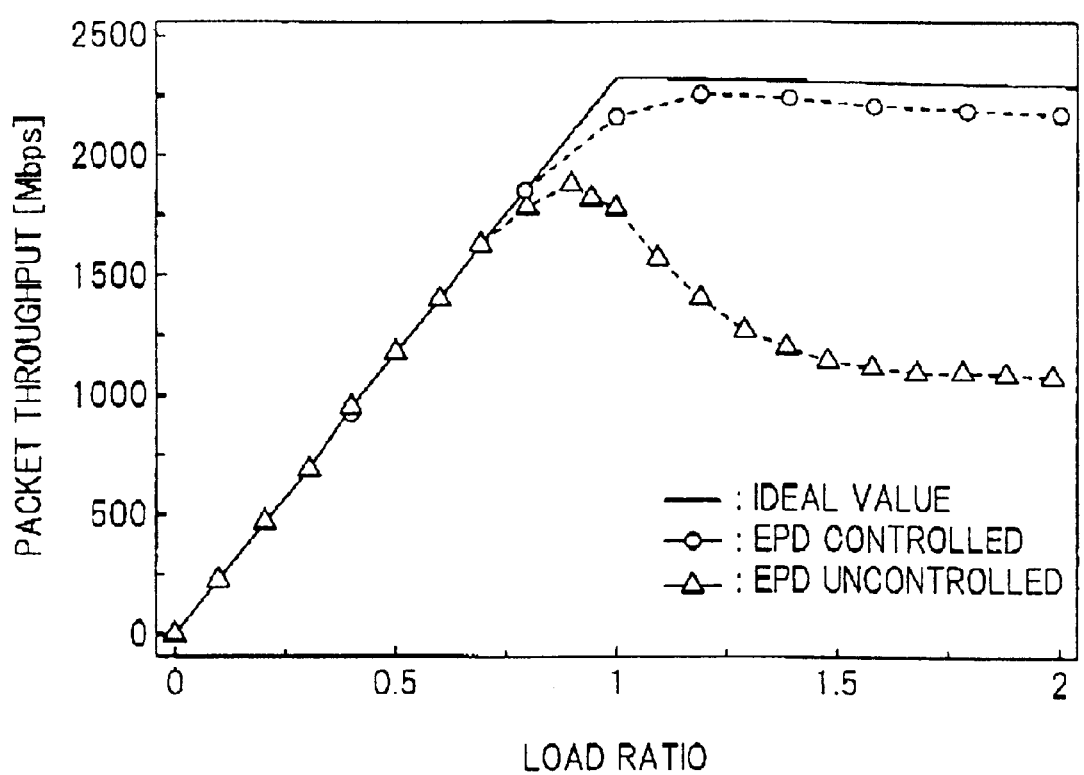
FIG. 6 is a characteristic diagram showing the effects of the invention.

FIG. 6 is a characteristic diagram showing the results of simulating the invention. The switch composition simulated is of a whole input of 29 Gbps band, an output of 2.4 Gbps band, about 900 cell buffers CB1-1 to CB1-y for output port group in FIG. 2, and a threshold value of 600 cells to determine SP.

Also, PD1 to PDx conduct EDP packet discard (FIG. 3).

FIG. 6 shows the simulation results of the throughput characteristic at the switch processing part when an on-off model traffic with average packet length of 100 cells is input to the output port while changing a load ratio to the output port.

A full line is an ideal line where there is no cell discard due to the burst arrival. Until when the load ratio becomes 1, bits input from the input port are in situ output from the output port. When the load ratio exceeds 1, bits to be limited to output of 2.4 Gbps are output regardless of the number of bits input.

EDP-controlled case is close to the ideal line. In EDP-uncontrolled case, when the load ratio becomes 1, the throughput characteristic is significantly reduced, compared with the ideal line. This is due to cell buffer overflow. Thus, FIG. 6 shows the effects of the invention.

Although the invention has been described with respect to specific embodiment for complete and clear disclosure, the appended claims are not to be thus limited by are to be construed as embodying all modification and alternative constructions that may occur to one skilled in the art which fairly fall within the basic teachings herein set forth.

What is claimed is:

1. A selective cell discard system in an asynchronous transfer mode (ATM) switch to exchange a cell input from a plurality of input ports to a plurality of output ports, for controlling the selective cell discard to guarantee quality of service (QOS) by controlling the order of cell discard or the read-out order of cells accumulated in a cell buffer when a number of cells exceeding the exchange capability of the switch is input, comprising:

a selective cell discard controller connected to each of said plurality of input ports;

a first-stage switch unit connected after said selective cell discard controller to receive an output from said selective cell discard controller, comprising:

a first plurality of cell buffers corresponding to output port groups into which said plurality of output ports are divided; and a cell multiplexer which multiplexes cells input from said plurality of input ports through said selective cell discard controller according to routing information of said cells;

a group of second-stage switch units corresponding to each of said first plurality of cell buffers for exchanging a cell in a concerned cell buffer in an output port group to any one of a second plurality of cell buffers corresponding to output ports belonging to a concerned output port group; and means for detecting a congestion in one of said cell buffers for an output port group, and discarding a cell to be input to the congested cell buffer for an output port group in said selective cell discard controller prior to said cell reaching said first-stage switch unit.

2. A selective cell discard system, according to claim 1, wherein:

all of controls to guarantee QOS except the selective cell discard control are conducted in said second-stage switch units.

3. A selective cell discard system, according to claim 2, wherein:

the cell discard conducted in said selective cell discard controller is set to have such a low discard ratio that does not influence the cell discard conducted in said second-stage switch units.

4. A selective cell discard system, according to claim 3, wherein:

a cell subject to the selective cell discard conducted in said selective cell discard controller is limited to a cell belonging to a service class of UBR (unspecified bit rate).

5. A selective cell discard system, according to claim 1, wherein said means for detecting congestion in one of said cell buffers for an output port group determines that a congestion exists when the amount of staying cells in a cell buffer for an output port group is greater than or equal to a threshold value that is provided for the cell buffer for an output port group.

6. A selective cell discard system, according to claim 5, wherein when a determination that congestion exists is made in one cell buffer for an output port group, a cell to be input to said one cell buffer for an output port group is unconditionally discarded in the selective cell discard controller.

7. A selective cell discard system in an asynchronous transfer mode (ATM) switch to exchange a cell input from a plurality of input ports to a plurality of output ports, for controlling the selective cell discard to guarantee quality of service (QOS) by controlling the order of cell discard or the read-out order of cells accumulated in a cell buffer when a number of cells exceeding the exchange capability of the switch is input, comprising:

a selective cell discard controller connected to each of said plurality of input ports;

a first-stage switch unit connected after said selective cell discard controller to receive an output from said selective cell discard controller, comprising:

a first plurality of cell buffers corresponding to output port groups into which said plurality of output ports are divided; and a cell multiplexer which multiplexes cells input from said plurality of input ports through said selective cell discard controller according to routing information of said cells;

a group of second-stage switch units corresponding to each of said first plurality of cell buffers for exchanging a cell in a concerned cell buffer in an output port group to any one of a second plurality of cell buffers corresponding to output ports belonging to a concerned output port group; and means for detecting a congestion in one of said cell buffers for an output port group, and discarding a cell to be input to the congested cell buffer for an output port group in said selective cell discard controller prior to said cell reaching said first-stage switch unit, wherein said means for detecting congestion in one of said cell buffers for an output port group determines that a congestion exists when the amount of staying cells in a cell buffer for an output port group is greater than or equal to a threshold value that is provided for the cell buffer for an output port group, wherein in addition to congestion, the discard controller further considers a connection discard state of arrival cell and whether the arrival cell is EOP (end of packet).

8. A selective cell discard system, according to claim 7, wherein a first threshold value and a second threshold value higher than said first threshold value are provided for said means for detecting the congestion in a cell buffer for an output port group, and the discard control is conducted according to a first congestion signal and a second congestion signal, as well as information as to a connection discard state of arrival cell and whether the arrival cell is EOP (end of packet).

9. A selective cell discard system, according to claim 1, wherein in said first-stage switch unit said plurality of input ports are divided into input port groups, each for the input port groups is provided with a cell multiplexer and dispersion buffers to said cell buffers for an output port group, a cell is input from each of said dispersion buffers through a switch corresponding to each of said dispersion buffers to said cell buffers for an output port group.

10. A selective cell discard system, according to claim 9, wherein the congestion information is output form said cell buffers for an output port group and said dispersion buffers.

* * * * *